United States Patent [19]

Sigal

[11] 4,344,716
[45] Aug. 17, 1982

[54] BEAM JOINING APPARATUS

[75] Inventor: Jacob Sigal, Cedar Rapids, Iowa

[73] Assignee: FMC Corporation, Chicago, Ill.

[21] Appl. No.: 214,158

[22] Filed: Dec. 8, 1980

[51] Int. Cl.³ .............................................. F16D 1/02
[52] U.S. Cl. ..................................... 403/13; 403/312; 403/337
[58] Field of Search ............... 403/312, 336, 338, 310, 403/335, 294, 314, 337, 13; 52/726

[56] References Cited

U.S. PATENT DOCUMENTS

| | | | |
|---|---|---|---|
| 904,210 | 11/1908 | Minard | 403/314 |
| 2,187,314 | 1/1940 | Greulich . | |
| 2,211,375 | 8/1940 | Greulich . | |
| 2,296,336 | 9/1942 | Crozier . | |
| 2,708,828 | 5/1955 | Pruyn | 52/726 X |
| 3,119,635 | 1/1964 | Dealy . | |
| 3,442,542 | 5/1969 | Watanabe . | |
| 3,456,413 | 7/1969 | Fischer . | |
| 3,628,300 | 12/1971 | Tsarumi . | |
| 4,009,550 | 3/1977 | Young | 52/726 |
| 4,024,688 | 5/1977 | Calini | 403/310 X |
| 4,050,211 | 9/1977 | Wahman | 52/726 |
| 4,196,557 | 4/1980 | Silvander | 52/726 |

FOREIGN PATENT DOCUMENTS

| | | | |
|---|---|---|---|
| A 21040 | of 1956 | Fed. Rep. of Germany | 403/337 |
| 1919686 | 11/1970 | Fed. Rep. of Germany | 403/312 |
| 1216426 | 12/1970 | United Kingdom | 403/337 |
| 1491168 | 11/1977 | United Kingdom | 403/292 |

Primary Examiner—Andrew V. Kundrat
Attorney, Agent, or Firm—L. B. Guernsey; A. J. Moore

[57] ABSTRACT

Apparatus for joining a pair of flanged beams in an end-to-end relationship includes a pair of end plates each welded to an end of a corresponding one of the flanged beams. Each of the end plates has a notch therein which is aligned with the notch in the other plate and the end plates juxtapose. A clamp having a body portion which mates with the notches in the end plates, and having a radial flange on each side of the body portion, is secured with the body portion in the notches. The radial flanges of the clamp presses against the end plates to lock the plates securely together.

10 Claims, 5 Drawing Figures

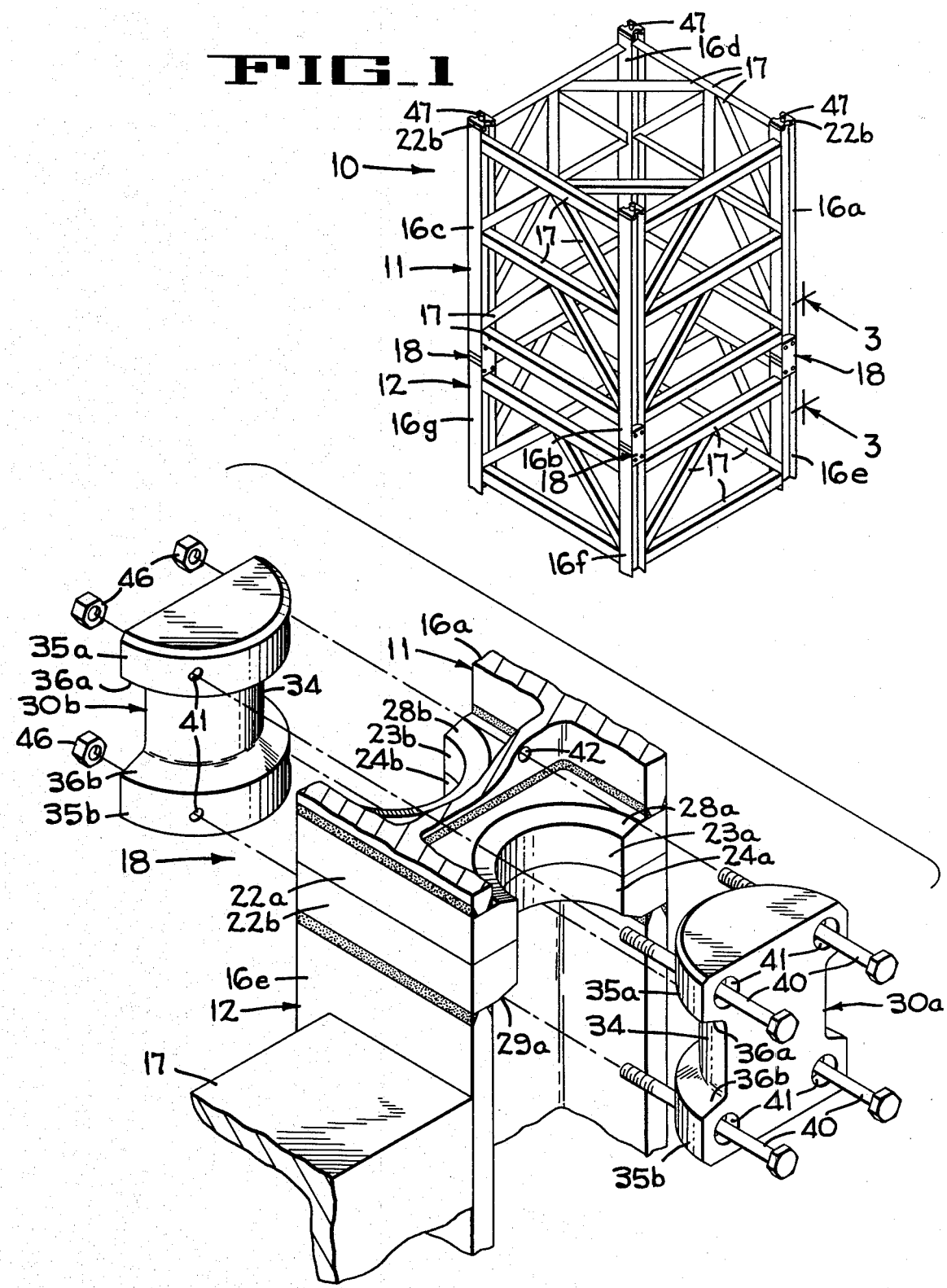

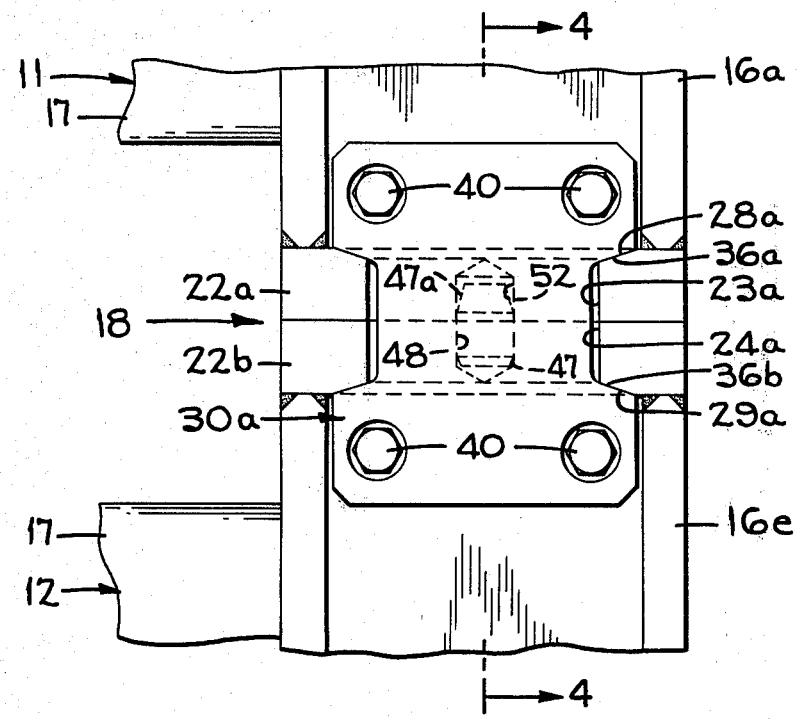
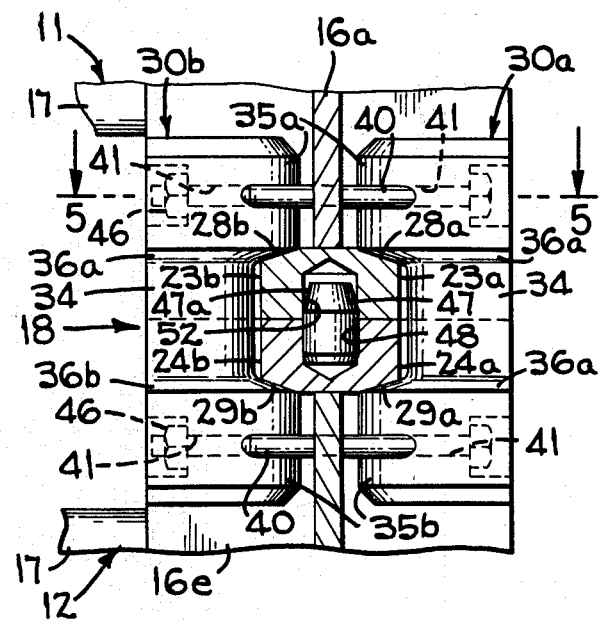
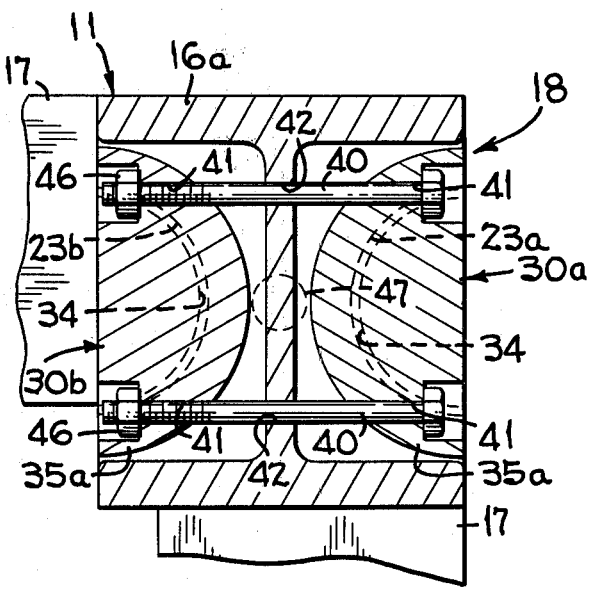

4,344,716

BEAM JOINING APPARATUS

BACKGROUND OF THE INVENTION

1. Field of the Invention

This invention relates to tower joints and, more particularly, to apparatus for connecting a pair of I-shaped beams in an end-to-end relationship.

2. Description of the Prior Art

Steel lattice towers are commonly used for supporting tower cranes and as booms for cranes. The towers include several tower sections bolted together to provide the required length. The tower sections are formed of a plurality of chords or lengths of beams interconnected by a plurality of cross members or braces to provide strength against excessive bending of the tower. In some of the prior art towers, the chords of adjacent tower sections are fastened together in an end-to-end fashion by connecting bolts between terminal plates which are welded to the ends of the chords of the adjacent sections.

These bolts must be designed for large magnitude tension forces acting along the chords. This requires that the bolts be made of a high strength alloy, that the bolts be heat treated and that they meet very strict quality control standards. All of these requirements make the bolts very expensive to manufacture. Due to the critical nature of the joints, the bolts must be tightened to a predetermined accurate preload value. The tightening process requires the use of special tools, instructions and procedures, and requires a lot of time to join two tower sections together.

Some prior art towers use chords having a circular cross section and use special clamps for joining the ends of adjacent round chords. These prior art clamps cannot be used with the H-shaped or the I-shaped beam chords.

SUMMARY OF THE INVENTION

The present invention overcomes some of the disadvantages of the prior art by welding end plates, each having a notch therein, to the end of I-shaped beams to be joined in an end-to-end relationship. A clamp having a body portion which mates with the notches in juxtaposed end plates and having a radial outward flange on each end of the body portion, clamps the plates together. The flanges of the clamp press against the end plates to hold the plates securely together. The cross-sectional area of the clamps can be several times as large as the cross-sectional area of bolts used to join prior art beams so the clamps can be made of relatively inexpensive steel or other material. Ordinary bolts or other fasteners can be used to secure the clamps in position in the notches of the end plates as the main stress of holding the beams together is absorbed by the clamps rather than the bolts.

BRIEF DESCRIPTION OF THE DRAWINGS

FIG. 1 is an isometric view of the steel lattice tower which employs apparatus of the present invention for joining flanged beams in an end-to-end relationship.

FIG. 2 is an enlarged exploded isometric view of the beam joining portion of the apparatus of FIG. 1.

FIG. 3 is an enlarged side elevation of the beam joining portion as viewed in the direction of arrows 3—3 of FIG. 1.

FIG. 4 is a vertical central section taken along the line 4—4 of FIG. 3.

FIG. 5 is a horizontal section taken along the line 5—5 of FIG. 4.

DESCRIPTION OF THE PREFERRED EMBODIMENT

Referring now to the drawings, FIG. 1 discloses a lattice tower 10 of the type that uses the beam joining apparatus of the present invention. The tower includes a pair of tower sections 11,12 each having a plurality of chords 16a–16d, 16e–16h of I-beams interconnected by a plurality of cross-members 17 to provide bracing of the chords. The tower sections 11,12 are joined together by a plurality of joints 18 which connect each of the I-beams 16a–16d to a corresponding adjacent beam 16e–16h in an end-to-end relationship as shown in detail in FIGS. 2–5.

The adjacent ends of the I-beams are each welded to an end plate 22a,22b (only two being shown in FIG. 2) each having a pair of semi-circular notches 23a,23b; 24a,24b in opposite edges thereof. The upper end plate 22a includes a pair of tapered cam surfaces 28a,28b on the upper portion adjacent the notches 23a,23b, and the lower plate 22b includes a pair of tapered cam surfaces 29a,29b on the lower portion adjacent the notches 24a, 24b. The end plates 22a,22b are connected to the ends of the chords 16a,16e with the notches 23a,24a and 23b,24b axially aligned with the open areas of the I-beams 16a,16e (FIGS. 2–6).

Each of the end plates 22a (FIGS. 2–5) is locked securely to a juxtaposed end plate 22b by a pair of generally semicylindrical clamps 30a,30b each having a groove or body portion 34 and having a pair of radially outward flanges 35a,35b at either end of the body portion. Each of the radial flanges 35a,35b includes a tapered surface 36a,36b (FIG. 2) extending between the body portion 34 and the radially outer edge of the flange. The body portion 34 of the clamps 30a,30b fits in a pair of the notches 23a,24a or 23b,24b and the cam surfaces 36a,36b of the clamps mate with the corresponding cam surfaces 28a,29a or 28b,29b of the end plates 22a,22b. The clamps 30a,30b are secured in the end plate notches 23a,23b,24a,24b by a plurality of bolts 40 each extending through one of a plurality of holes 41 in the clamps and through one of a plurality of holes 42 in the I-beams 16a,16e (FIGS. 2–5). A plurality of nuts 46 are tightened on an end portion of the bolts 40 to move the clamps 30a,30b toward each other and secure the end plates 22a,22b securely together. The plates 22a,22b are forced together by the cam surfaces 36a,36b of the clamp 30a pressing against the surfaces 28a,29a and the cam surfaces 36a,36b of the clamp 30b pressing against the surfaces 28b,29b of the end plates 22a,22b. The bolts 40 merely hold the clamps 30a,30b in position and the stress on the bolts is relatively low so that relatively inexpensive bolts can be used to secure the clamps in position.

When the tower sections 11,12 (FIG. 1) are to be joined the end plates 22a,22b are guided into axial alignment by a tapered pin 47 (FIGS. 3,4) mounted in a bore 48 in the lower end plate 22b. The upper end plate 22a is positioned above the pin 47 and a bore 52 in the end plate 22a is generally aligned with the pin 47. A tapered upper end 47a of the pin 47 facilitates moving the pin into the alignment bore 52 as the end plate 22a is lowered into contact with the end plate 22b. The clamps 30a,30b are then positioned in the notches 23a,24a,23b,24b, the bolts 40 inserted through the holes 41 of the clamps and holes 42 of the beams, and the nuts 46 are threaded on the bolts 40 to lock the tower sections 11,12 together.

Thus, the present invention provides apparatus for connecting two I-beams securely together in an end-to-end relationship using a pair of end plates each welded to the end of a corresponding one of the I-beams. A pair of semicylindrical clamps fit into notches in the end plates, and flanges at each end of the clamps grasp the adjacent end plates to hold the end plates securely together. Ordinary bolts are used to retain the clamps in position in the notches in the end plates.

Although the best mode contemplated for carrying out the present invention has been herein shown and described, it will be apparent that modification and variation may be made without departing from what is regarded to be the subject matter of the invention.

What is claimed is:

1. Apparatus for joining a pair of flanged beams in an end-to-end relationship comprising:
   a pair of end plates each having a pair of semi-circular notches therein;
   means for connecting each of said end plates to an end of a corresponding one of said beams;
   a pair of semicylindrical clamps each having a groove which mates with said notches in said pair of end plates, said clamps each having radial flanges on either side of said groove; and
   means for securing one of each of said pair of semicylindrical clamps to the other of said pair of semicylindrical clamps with said groove of one of each of said pair of semicylindrical clamps in one of each of said notches of said pair of juxtaposed end plates with the outer edges of said flanges pressing against the outer edges of said end plates and with said radial flanges clamping said pair of end plates in a secure connection.

2. The apparatus as defined in claim 1 wherein said means for securing said clamps includes a plurality of bolts and means for connecting said bolts between a first of said clamps and a second of said clamps.

3. Apparatus for joining a pair of flanged beams in an end-to-end relationship comprising:
   a pair of end plates each having a pair of semi-circular notches therein;
   means for connecting each of said end plates to an end of a corresponding one of said beams;
   a pair of semicylindrical clamps each having a groove which mates with said notches in said pair of end plates, said clamps each having radial flanges on either side of said groove; and
   a plurality of bolts and means for connecting said bolts between a first of said clamps and a second of said clamps with said groove in said notches of said pair of juxtaposed end plates.

4. Apparatus as defined in claim 3 wherein said end plates are each welded to the end of a corresponding one of said beams.

5. Apparatus as defined in claim 3 wherein each of said clamps includes a tapered cam surface on each of said radial flanges, and wherein each of said cam surfaces presses against a corresponding one of said end plates to clamp said end plates together.

6. Apparatus as defined in claim 5 wherein each of said end plates includes a tapered cam surface which mates with one of said cam surfaces on said clamp to press one of said end plates into a firm connection with the other of said end plates as said clamp moves radially into said notches in said end plates.

7. Apparatus as defined in claim 3 including means for axially aligning the ends of said beams when said end plates are juxtaposed.

8. Apparatus for joining a pair of flanged beams in an end-to-end relationship comprising:
   a pair of end plates each having a pair of semi-circular notches therein;
   means for connecting each of said end plates to an end of a corresponding one of said beams;
   a pair of semicylindrical clamps each having a groove which mates with said notches in said pair of end plates, said clamps each having radial flanges on either side of said groove;
   means for securing each of said clamps with said groove in the notches of a pair of juxtaposed end plates and with said radial flanges clamping said pair of end plates in a secure connection;
   a tapered pin attached to one of said end plates; and
   a bore in the other of said end plates for receiving said tapered pin to move said end plates into axial alignment as said end plates are moved toward each other.

9. Apparatus for joining a pair of I-shaped beams in and end-to-end relationship comprising:
   a pair of generally rectangular end plates each having a pair of notches with one notch in each of the opposite edges of said plates;
   means for connecting each of said end plates to an end of a corresponding one of said beams with said notches aligned with the open areas of said I-shaped beam ends;
   a pair of clamps each having a groove portion which mates with said notches in said pair of end plates, said clamps each having radially extending flanges on both sides of said notches; and
   means for securing each of said clamps with said groove portion in the notches of a pair of juxtaposed end plates with said radial flanges clamping said pair of end plates in a secure connection.

10. Apparatus as defined in claim 9 wherein each of said clamps includes a tapered cam surface on each of said radial flanges, and wherein each of said cam surfaces presses against a surface of a corresponding one of said end plates to clamp said end plates together when said clamps are mounted in said notches of a pair of juxtaposed end plates.

* * * * *